United States Patent [19]

Barker

[11] 4,061,986
[45] Dec. 6, 1977

[54] SOFT POWER SUPPLY FOR PULSED LASER

[75] Inventor: Gerald C. Barker, Palo Alto, Calif.

[73] Assignee: Coherent Radiation, Palo Alto, Calif.

[21] Appl. No.: 646,330

[22] Filed: Jan. 2, 1976

[51] Int. Cl.² .................... H01S 3/09; H01S 3/097
[52] U.S. Cl. ...................... 331/94.5 PE; 315/171; 315/DIG. 7
[58] Field of Search ............... 331/94.5; 330/4.3; 315/163, 164, 171, 176, DIG. 5, DIG. 7, 165

[56] References Cited

U.S. PATENT DOCUMENTS 2,947,911  8/1960  Linden ........................... 315/176 X
3,453,490  7/1969  Hallock et al. ................. 331/94.5 X Primary Examiner—John Zazworsky
Attorney, Agent, or Firm—Limbach, Limbach & Sutton

[57] ABSTRACT

A pulsed power supply for a gas discharge laser in which a main DC power supply is connected in series with a current limited DC power supply and a gas discharge laser and with diode means connected across the second power supply for bypassing the second power supply and conducting current from the main power supply to the laser after the laser ionizes.

6 Claims, 2 Drawing Figures

SOFT POWER SUPPLY FOR PULSED LASER

BACKGROUND OF THE INVENTION

This invention relates to gas discharge lasers, and more particularly to a pulsed power supply for a gas discharge laser.

A $CO_2$ laser power supply has to be capable of initiating and maintaining a glow discharge in a mixute of $CO_2$, helium and nitrogen at a pressure of 20 torr. Typically, the voltage required for ionization is approximately 20,000 volts per meter while that required to sustain the discharge current at 50 milliamperes is approximately 10,000 V/m.

If a single supply is used to drive a 1½ meter laser tube, it would have to be able to deliver 30,000 V at 50 mA despite the fact that it will normally only need to deliver 15,000 V at 50 mA. In some prior art circuits a second power supply is connected in parallel with the first power supply in order to provide the initial higher voltage to ionize the tube. Such circuits are discussed in U.S. Pat. Nos. 3,491,309, 3,532,930, 3,588,740 and 3,842,365.

All hitherto prior art circuits of this type suffer from the disadvantages that they are inherently unreliable in being triggered, they are relatively complex to design for specific frequencies and laser tube lengths, and they contain more materials and parts than are desirable.

SUMMARY OF THE INVENTION

The above and other disadvantages are overcome by the present invention of a combination of a laser discharge tube having first and second electrodes and containing a gas capable of being ionized by electrical discharge between the first and second electrodes, a first direct current power supply, a second, current limited direct current power supply connected in series with the first power supply and the laser discharge tube, and diode means connected in parallel with the second power supply for bypassing the second power supply and conducting current directly from the first power supply to the laser after the laser ionizes.

In one preferred embodiment the second power supply includes a 3-phase direct current rectifier and the diode means include a semiconductor diode connected across the second power supply with its anode to the negative output of the power supply and its cathode connected to the positive output of the second power supply. The diode means further include a capacitor and a resistor connected in parallel with the diode. In normal operation the laser discharge tube is repetitively pulsed so that the circuit further includes the first and second power supplies and the diode means, as described above, together with an electronic switch in the series circuit. This electronic switch is repetitively turned on and off by means of a pulse generator operating at the desired frequency for pulsing the gas discharge laser. In the preferred embodiments the second power supply has a recovery time on the order of 5 msec and the laser discharge tube can be pulsed at rates of 1 hertz to 1 kHz with pulse lengths of 100 $\mu$sec to 1 second.

In still another embodiment a plurality of laser discharge tubes are light coupled together in series and a plurality of diode means are connected in parallel with the second power supply. Each of the diode means is separately connected to one electrode of each tube with the other electrodes of the tubes being connected to the main power supply. In this way the first and second power supplies are connected in series with each of the tubes but separate diode means are provided for each tube. This is necessary because in some circumstances the tube do not ionize simultaneously and thus the second power supply is individually bypassed by each of the separate diode means as each of the respective laser discharge tubes ionizes.

It is therefore an object of the present invention to provide a pulse power supply for a gas discharge laser which is of relatively simple construction.

It is another object of the present invention to provide a pulse power supply for a gas discharge laser which is reliable in operation.

It is still another object of the invention to provide a pulse discharge power supply for individually operating a plurality of light coupled laser discharge tubes.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
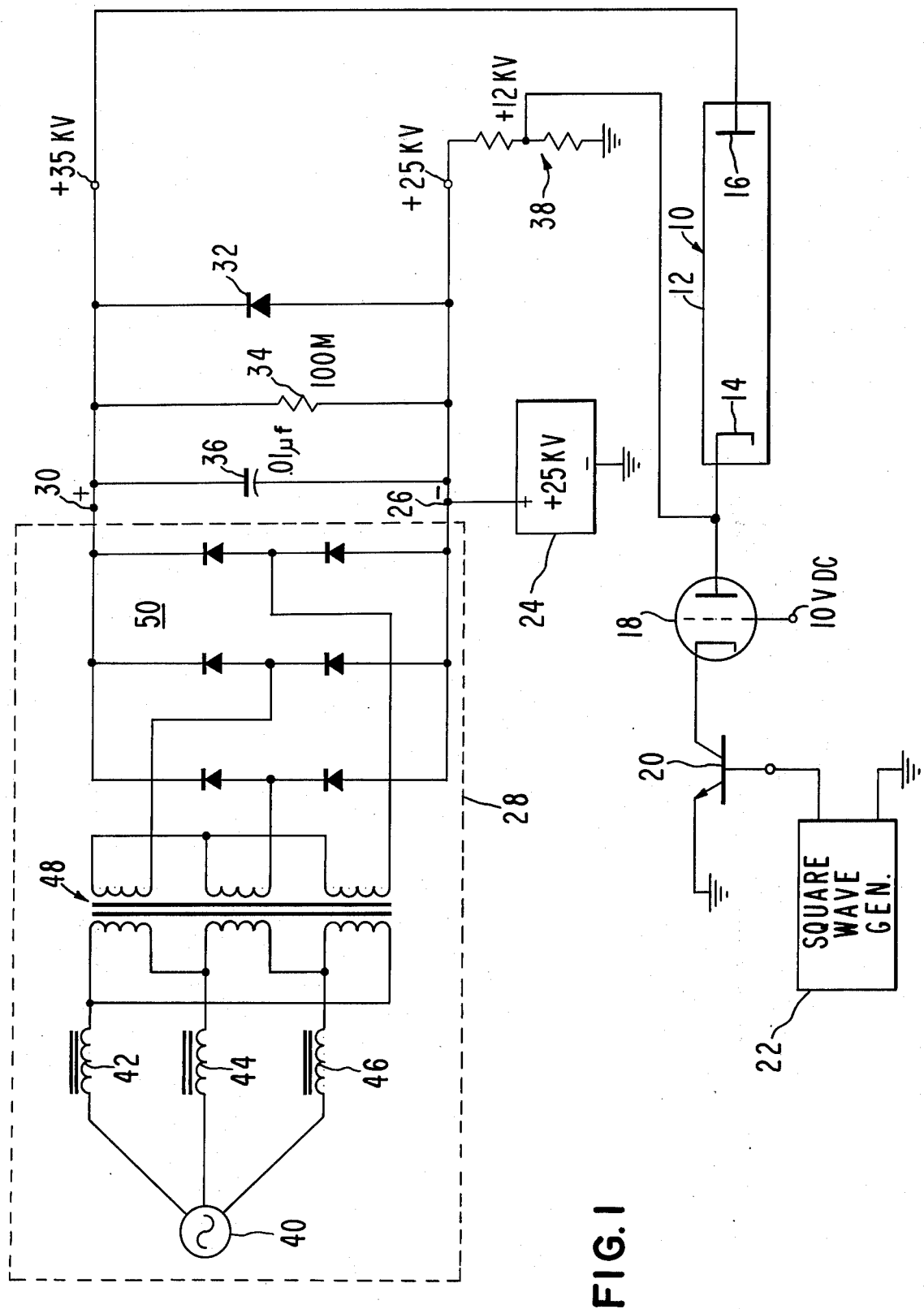
FIG. 1 is a schematic diagram of a laser discharge tube and a pulse power supply for it according to a first embodiment of the invention.

Referring now more particularly to FIG. 1 a laser discharge tube 10, such as a $CO_2$ gas laser, has an envelope 12 and a first electrode 14 and a second electrode 16. Electrode 16 can be thought of in terms of the anode of the device and the electrode 14 can be thought of as the cathode of the device. The cathode 14 is connected to the plate electrode of a triode vacuum tube 18 whose cathode is connected to the collector electrode of an NPN transistor 20. The emitter electrode of the transistor 20 is connected to the circuit ground and its base electrode is supplied with a square wave voltage from a square wave generator 22. The grid of the triode 18 is supplied with a 10 volt DC bias from an external source.

A first and main power supply 24 has its negative output grounded and its positive output connected to a negative output terminal 26 of a second power supply 28. The power supply 24 produces 25,000 V at approximately 50 mA. The power supply 28 produces approximately 10,000 V at 20 mA maximum. The power supply 28 has a positive output terminal 30 which is connected to the anode 16 of the laser discharge device 10.

With the power supplies 24 and 28 with the laser discharge tube 10 and the electronic switch 20 all connected in series, an initial voltage of 35,000 V is supplied across the laser 10. Prior to ionization of the gas contained within the laser discharge tube it draws almost no current. As soon as it ionizes, and thus becomes conductive, it draws a current which may be as high as 50 mA. Because the power supply 28 is designed to have a relatively high internal resistance, the voltage across the terminals 26 and 30 will thus be reduced to virtually zero. But since the laser discharge tube 10 only requires a maintenance voltage which is less than the starting voltage it is only necessary to continue the voltage from the power supply 24 at the current which will sustain ionization in the laser discharge device. In order to maintain this current path to the laser discharge device a diode 32 has its anode connected to the terminal 26 and its cathode connected to the terminal 30. A resistor 34 and a capacitor 36 are connected in parallel with the diode 32 across the terminals 26 and 30. In operation, when the laser discharge tube 10 ionizes and the voltage across the terminals 30 and 26 supplied by the "soft" power supply 28 drops to virtually zero the diode 32 becomes forward biased and provides a current path from the positive output terminal of the power supply 24 to the anode 16 of the laser discharge device 10. The resistance 34, the capacitor 36 and the internal values of the power supply 28 are so selected that when the laser discharge device 10 is turned off by making the transistor 20 nonconductive, the +10 kV voltage across the terminals 26 and 30 will appear within a time period which is not greater than approximately 5 msec. When this happens the laser discharge tube 10 is ready to be restarted as soon as the transistor 20 is made conductive.

A voltage divider circuit 38 is connected between the terminal 26 and the circuit ground and a tap from the voltage divider circuit is connected to the plate of the vacuum tube 18 in order to supply appropriate bias to it. The voltage supplied to the plate of the tube 18 is approximately 12,000 V.

The soft power supply 28 includes a 3-phase alternating current source 40 which may be a 3-phase external power supply such as from the utility lines, which feeds through three separate choke coils 42, 44 and 46 to a delta wired primary of a 3-phase transformer 48. The secondary windings of the transformer 48 are connected in "Y" fashion to a 3-phase rectifier bridge 50 whose output terminals are the terminals 26 and 30. The purpose in having a 3-phase rectified power supply is that this ensures a speedy recovery time without the necessity of large storage capacitors as compared with a single-phase rectified power supply.

Figure 2:
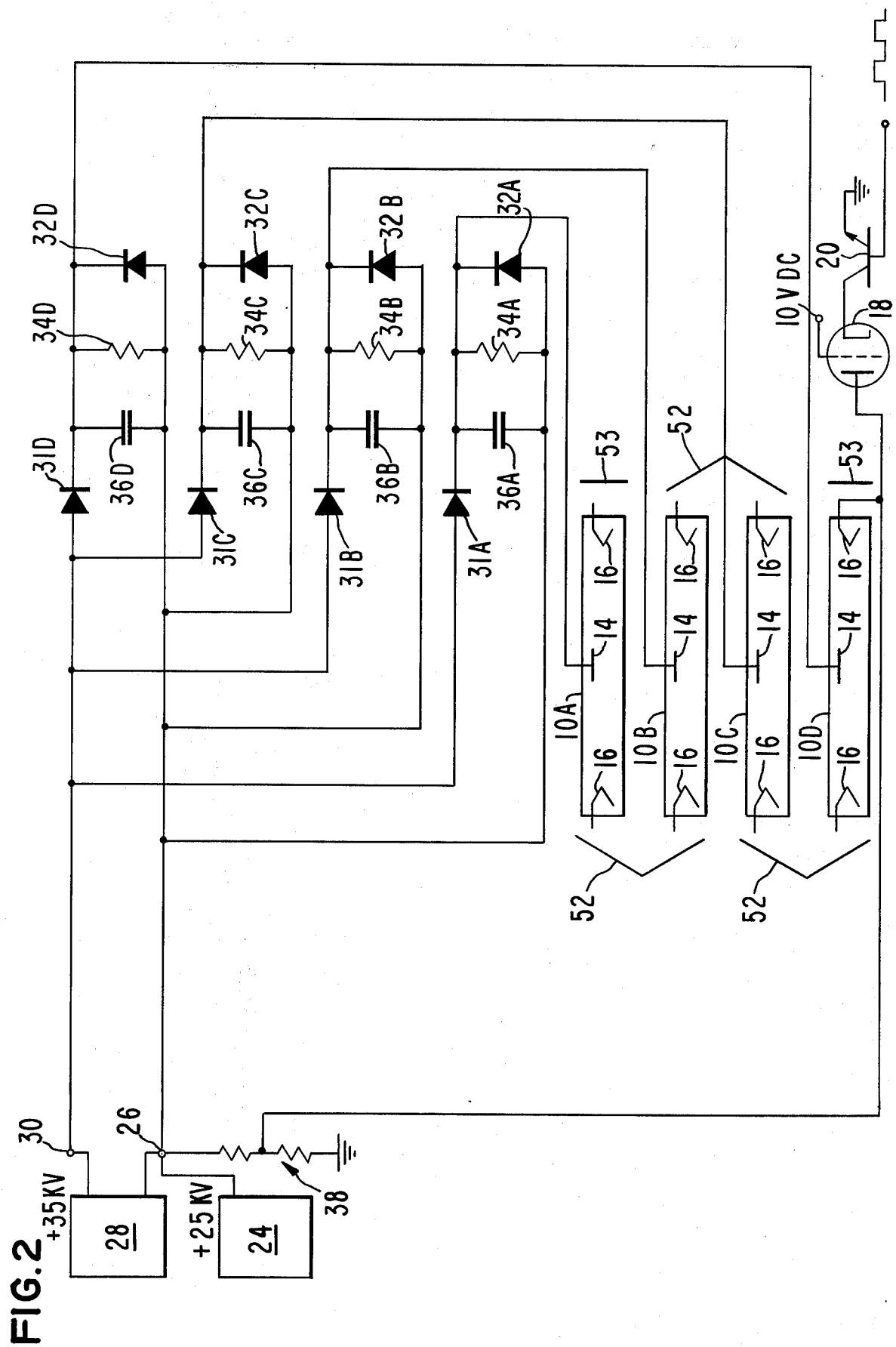
FIG. 2 is a modification to the circuit diagram depicted in FIG. 1 for operation of a plurality of light coupled laser discharge tubes according to a second embodiment of the invention.

Referring now more particularly to FIG. 2 it is sometimes desirable to have a plurality of such gas discharge tubes 10A, 10B, 10C and 10D light coupled together in series by corner reflector mirror assemblies 52. The tubes 10A and 10D also each have separate plane, end reflectors 53. Each of such tubes commonly has a pair of cathodes 16 and an anode 14 situated between the cathodes 16. It is not practical to use a single power supply 28 and diode 32 connected to such tubes 10A, 10B, 10C and 10D in parallel because the laser discharge tubes do not ionize simultaneously. What would happen if only a single diode circuit were used would be that the first laser discharge tube to ionize would cause the soft power supply 28 to be shunted by the diode 32 and the remaining tubes would not be ionized. In order to prevent this from happening a plurality of diode circuits are used and connected in parallel with the tubes.

Thus each of the tubes 10A-10D has a separate diode bypassing circuit for the soft power supply 28. For example, a diode 31A is connected with its anode to the output terminal 30 of the power supply 28 and its cathode connected to the anode 14 of the laser discharge tube 10A. A capacitor 36A, a resistor 34A and a diode 32A are connected in parallel between the output terminal 26 of the power supply 28 and the anode 14 of the laser discharge device 10A. The orientation of the diode 32A is that its anode is connected to the terminal 26 and its cathode is connected to the anode 14. The other laser discharge tubes 10B, 10C and 10D are similarly connected by separate diode circuits having the same reference numerals with corresponding letters. The cathodes 16 of all the laser tubes 10A-10D are individually connected to separate switching means comprising vacuum tubes 18 in series with transistors 20 as described above with reference to FIG. 1. For convenience only one such switching circuit is shown in FIG. 2 as being connected to the cathode of tube 10D, it being understood that each of the cathodes 16 of the tubes 10A, 10B, 10C and 10D have their own associated switching means.

In operation, assuming that the transistor 20 is in a conducting state the capacitors 36A, 36B, 36C and 36D will supply a 10,000 V potential in series with the +25,000 V potential from the source 24 to their respective laser discharge tubes 10A, 10B, 10C and 10D. Assuming that the laser discharge tube 10A is the first to ionize, the voltage across the terminals 30 and 26 will be reduced to virtually zero because of the high internal resistance of the power supply 28 and the increased current carrying capacity of the ionized tube 10A. Current to maintain the tube 10A in its ionized state will flow from the power supply 24 through the diode 32A to the anode 14. Each of the other diodes 31B, 31C and 31D will then become reversed biased and nonconducting to prevent their associated capacitors 36B, 36C and 36D from discharging through the ionized laser 10A. The other laser tubes 10B, 10C and 10D will instead become ionized in an undetermined sequence and will similarly be maintained in their ionized state by current from the power supply 24 which passes through their respective diodes 32B, 32C and 32D.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. In combination, a laser discharge tube adapted for repetitive pulsed operation and having first and second electrodes and containing a gas capable of being ionized by electrical discharge between the first and second electrodes, switching means for repetitively energizing said pulsed laser discharge tube at a predetermined frequency by selectively providing a current path through said discharge tube, a first direct current power supply, a second direct current, current limited power supply connected across the electrodes of the laser discharge tube and in series with the first power supply and the switching means, the second power supply including means for reducing its output to a minimal predetermined value when the current drawn from it is equal to the current drawn by the laser discharge tube when said gas within said tube is ionized during each pulsed energization of the discharge tube, and diode means connected in parallel with the output of the second power supply for bypassing the second power supply and conducting current from the first power supply to said laser discharge tube electrodes after the laser discharge tube gas is ionized to maintain the laser discharge tube in its ionized state, whereby the laser discharge tube may be repeatedly pulsed at its predetermined rate.

2. The combination as recited in claim 1 wherein the second power supply is a 3-phase alternating current rectified power supply.

3. A laser control circuit for a laser discharge tube of the type adapted for repetitive pulsed operation and having first and second electrodes and containing a gas capable of being ionized by electrical discharge between the first and second electrodes, the laser control ciruit comprising electronic switching means for repetitively energizing said pulsed laser discharge tube at a predetermined frequency by selectively providing a current path through said discharge tube, a first direct current power supply and a second, current limited power supply connected across the electrodes of the pulsed laser tube and in series with the first power supply and the electronic pulsing switching means, and further including diode means connected across the second power supply for bypassing the second power supply and conducting current from the first power supply to the laser tube after the laser tube is ionized during each pulsed energization of the discharge tube, whereby the laser may be operated in a repetitively pulsed manner at a predetermined frequency under the control of the electronic switching means with the second power supply providing current to the laser only until the gas within the laser tube is ionized.

4. A laser control circuit as recited in claim 3 wherein the diode means has a time constant such that the second power supply is capable of supplying its full power output within 5 milliseconds after deionization of the laser discharge tube.

5. A laser control circuit as recited in claim 3 for a plurality of light coupled laser discharge tubes and further comprising a plurality of diode means connected in parallel with the second power supply and each connected separately to one electrode of each of the laser discharge tubes whose other electrodes are separately connected to the common terminal of the first power supply.

6. A laser control circuit as recited in claim 3 wherein the diode means comprise a capacitor, a resistor and a diode connected in parallel with the diode being reverse biased by the output of the second power supply prior to ionization of the laser discharge tube.

* * * * *